United States Patent
Kressin

(10) Patent No.: US 9,215,941 B1
(45) Date of Patent: Dec. 22, 2015

(54) FRAME ASSEMBLY

(71) Applicant: MCS Industries, Inc., Easton, PA (US)

(72) Inventor: Matthew Scott Kressin, Allentown, PA (US)

(73) Assignee: MCS INDUSTRIES, INC.

( * ) Notice: Subject to any disclaimer, the term of this patent is extended or adjusted under 35 U.S.C. 154(b) by 0 days.

(21) Appl. No.: 14/554,931

(22) Filed: Nov. 26, 2014

(51) Int. Cl.
*A47G 1/06* (2006.01)
*A47F 7/14* (2006.01)
*G11B 33/04* (2006.01)

(52) U.S. Cl.
CPC . *A47F 7/142* (2013.01); *A47G 1/06* (2013.01); *G11B 33/045* (2013.01)

(58) Field of Classification Search
CPC ........ A47F 7/142; A47G 1/06; B65D 25/205; G11B 33/0427
USPC .................. 40/768; 206/308.1, 310
See application file for complete search history.

(56) References Cited

U.S. PATENT DOCUMENTS

| | | | |
|---|---|---|---|
| 2,663,416 A * | 12/1953 | Hirsch ................ | B65D 85/544 206/310 |
| 4,041,630 A | 8/1977 | Holbrook | |
| 4,258,488 A | 3/1981 | Schienbein | |
| 4,261,123 A | 4/1981 | Mariotti | |
| 4,499,994 A | 2/1985 | Rentch | |
| 4,536,979 A | 8/1985 | Parkinson | |
| 4,771,890 A * | 9/1988 | Hofland et al. ....... | G11B 23/03 206/308.1 |
| 4,793,479 A * | 12/1988 | Otsuka et al. ...... | G11B 33/0427 206/308.1 |
| 5,533,614 A * | 7/1996 | Walker ................ | G11B 33/045 206/308.1 |
| 5,738,008 A * | 4/1998 | Freund ................ | B41J 2/01 101/35 |
| 5,819,926 A * | 10/1998 | O'Brien et al. ..... | G11B 33/0494 206/308.1 |
| 6,065,593 A * | 5/2000 | Howerton et al. ... | G11B 33/045 206/308.2 |
| 6,070,721 A | 6/2000 | Levitan | |
| 6,715,620 B2 | 4/2004 | Taschek | |
| 6,874,645 B2 * | 4/2005 | Broderick ............ | G11B 33/045 206/308.1 |
| 7,165,671 B2 * | 1/2007 | Wetsch ............... | G11B 33/0427 206/308.1 |
| 7,665,603 B2 * | 2/2010 | Leesberg ............. | E05B 73/0023 206/1.5 |
| 8,667,721 B2 | 3/2014 | Heeps | |
| 2003/0066769 A1 * | 4/2003 | Huang ............... | G11B 33/0427 206/310 |
| 2008/0110071 A1 * | 5/2008 | Farnsworth et al. ................. | G11B 33/0422 40/722 |
| 2014/0150314 A1 | 6/2014 | Herz | |

* cited by examiner

*Primary Examiner* — Shin Kim
(74) *Attorney, Agent, or Firm* — Belles Katz LLC

(57) ABSTRACT

A frame assembly for displaying a flat article and a combined frame assembly and flat article. In one aspect, the frame assembly comprises a frame, a coupler, a backer panel, and a window panel. The frame comprises a floor structure, a wall coupled to the floor structure, a locking feature on the wall, and a coupling member. The coupler comprises a retaining member and a mounting member. The coupler is coupled to the coupling member of the frame by interaction between the mounting member of the coupler and the coupling member. The retaining member of the coupler protrudes into a display cavity of the frame for retaining a flat article by the retaining member extending into an opening in the flat article. The window panel is positioned in the display cavity of the frame and the locking feature retains the window panel within the display cavity.

20 Claims, 10 Drawing Sheets

FRAME ASSEMBLY

FIELD OF THE INVENTION

The present invention relates generally to frames, and specifically to frame assemblies for displaying a flat article having an opening therein such as a record album, a vinyl record, a CD, or a DVD.

BACKGROUND OF THE INVENTION

The collection of record albums, also known as vinyl records, is a favorite pastime of many individuals. Such individuals take great pride in maintaining their record albums and the covers for such record albums in mint condition. Furthermore, many people have found it pleasing to display their record albums or album covers on the walls in their home for decoration. Several types of record album frames have been designed to display record album covers in such a way as to leave them undamaged. However, all previously designed frames of this type suffer from drawbacks related to ease of manufacturing, ease of use by an end user, and the like. Furthermore, very few frames have been developed that are able to frame and protect either the record albums or their covers. Thus, a need exists for a frame for displaying one of a record album or a record album cover that overcomes the deficiencies and drawbacks of the conventional frames of this type.

SUMMARY OF THE INVENTION

Exemplary embodiments according to the present disclosure are directed to a frame assembly for displaying a flat article. The frame assembly generally comprises a frame, a coupler, a backer panel, and a window panel. The frame comprises a floor structure, a wall coupled to and surrounding the floor structure, a locking feature on the wall, and a coupling member. The coupler comprises a retaining member and a mounting member. The coupler is coupled to the coupling member of the frame by interaction between the mounting member of the coupler and a mating feature of the coupling member. The retaining member of the coupler protrudes into a display cavity of the frame for retaining a flat article by the retaining member extending into an opening in the flat article and engaging a periphery of the opening of the flat article. The window panel is positioned in the display cavity of the frame such that the locking feature retains the window panel within the display cavity.

In one aspect, the invention can be a frame assembly for displaying a flat article having an opening, the frame assembly comprising: a frame comprising: a floor structure; an outer annular wall coupled to and surrounding the floor structure, the outer annular wall comprising an outer surface defining a periphery of the frame, an inner surface defining a display cavity, a rear edge, and a front edge that defines a display opening configured to allow the flat article to pass therethrough into the display cavity; a locking feature on the inner surface of the outer annular wall adjacent the front edge; and a coupling member comprising a mating feature; a coupler comprising a retaining element and a mounting element, the mounting element of the coupler coupled to the mating feature of the coupling member of the frame so that the retaining element protrudes into the display cavity; a backer panel having an opening therethrough, the backer panel positioned in the display cavity adjacent to the floor structure, the retaining element of the coupler extending through the opening of the backer panel; the retaining element of the coupler configured to extend into the opening of the flat article and engage a periphery of the opening of the flat article to couple the flat article to the coupler when the flat article is positioned in the display cavity; and a window panel positioned in the display cavity, the locking feature on the inner surface of the outer annular wall retaining the window panel and the backer panel within the display cavity.

In another aspect, the invention can be a frame assembly for displaying a flat article, the frame assembly comprising: a frame comprising: a floor structure; a wall coupled to and surrounding the floor structure, the wall comprising an outer surface defining a periphery of the frame, an inner surface defining a display cavity, a rear edge, and a front edge that defines a display opening configured to allow the flat article to pass therethrough into the display cavity; a locking feature on the inner surface of the wall adjacent the front edge; and a coupling member; a coupler comprising a retaining element and a mounting element, the mounting element of the coupler coupled to the coupling member of the frame so that the retaining element protrudes into the display cavity, the retaining element of the coupler configured to extend into an opening of the flat article and engage a periphery of the opening of the flat article to couple the flat article to the coupler; and a window panel positioned in the display cavity and retained in the display cavity by the locking feature on the inner surface of the wall of the frame.

In a further aspect, the invention can be a combined frame assembly and displayed article comprising: a frame comprising: a floor structure; a wall coupled to and surrounding the floor structure, the wall comprising an outer surface defining a periphery of the frame, an inner surface defining a display cavity, a rear edge, and a front edge that defines a display opening configured to allow the flat article to pass therethrough into the display cavity; a locking feature on the inner surface of the wall adjacent the front edge; and a coupling member comprising a mating feature; a coupler comprising a retaining element and a mounting element, the mounting element of the coupler coupled to the mating feature of the coupling member of the frame so that the retaining element protrudes into the display cavity; a backer panel having an opening therethrough, the backer panel positioned in the display cavity adjacent to the floor structure, the retaining element of the coupler extending through the opening in the backer panel; a displayed article having an opening positioned in the display cavity adjacent to the backer panel, the retaining element of the coupler extending into the opening in the displayed article to engage a periphery of the opening of the displayed article to couple the displayed article to the coupler; and a window panel positioned in the display cavity adjacent to the displayed article, the locking feature on the inner surface of the wall retaining the window panel, the displayed article, and the backer panel within the display cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The following detailed description of the exemplary embodiments will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
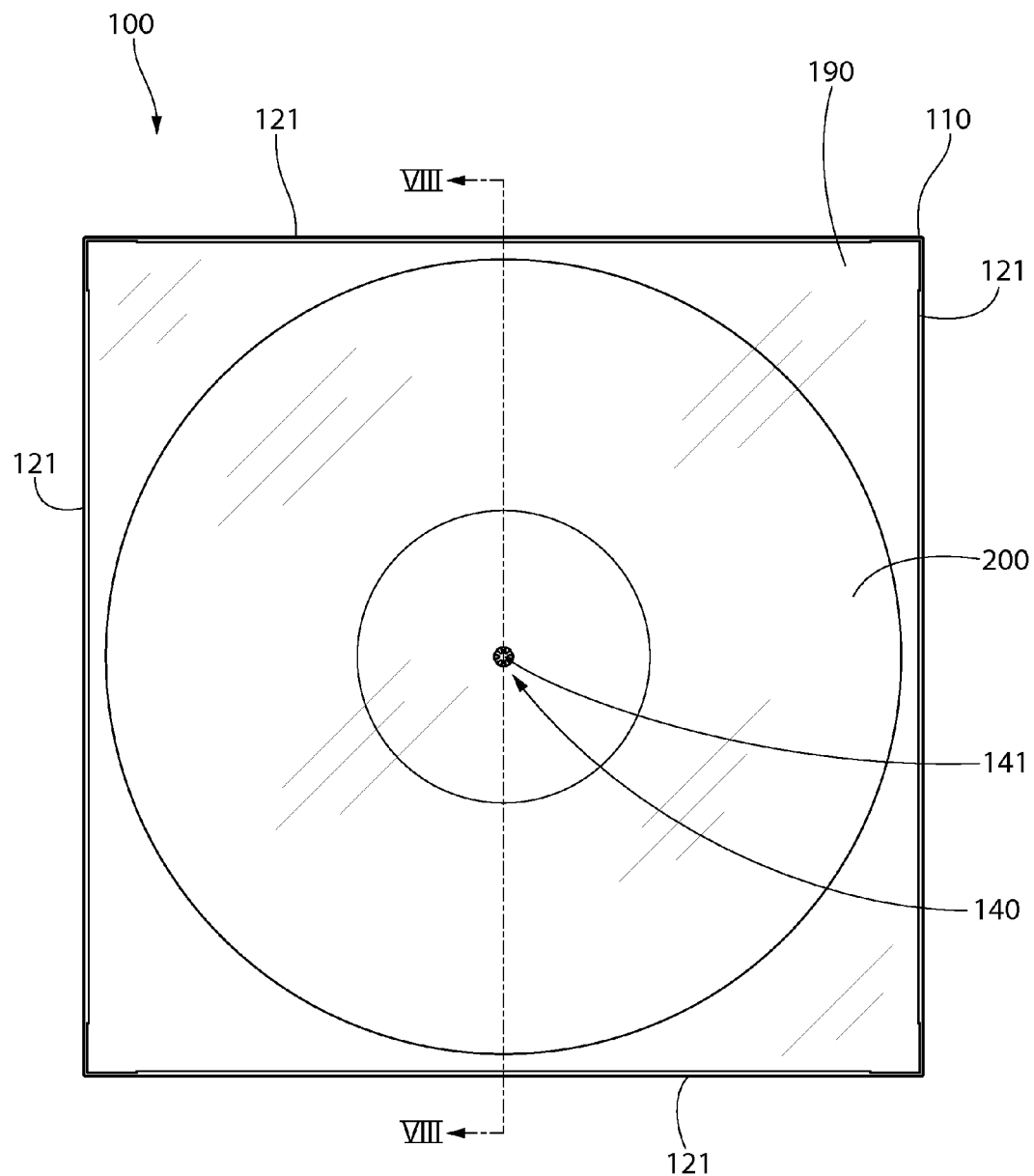
FIG. 1 is a front view of a frame assembly in accordance with an embodiment of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Figure 2:
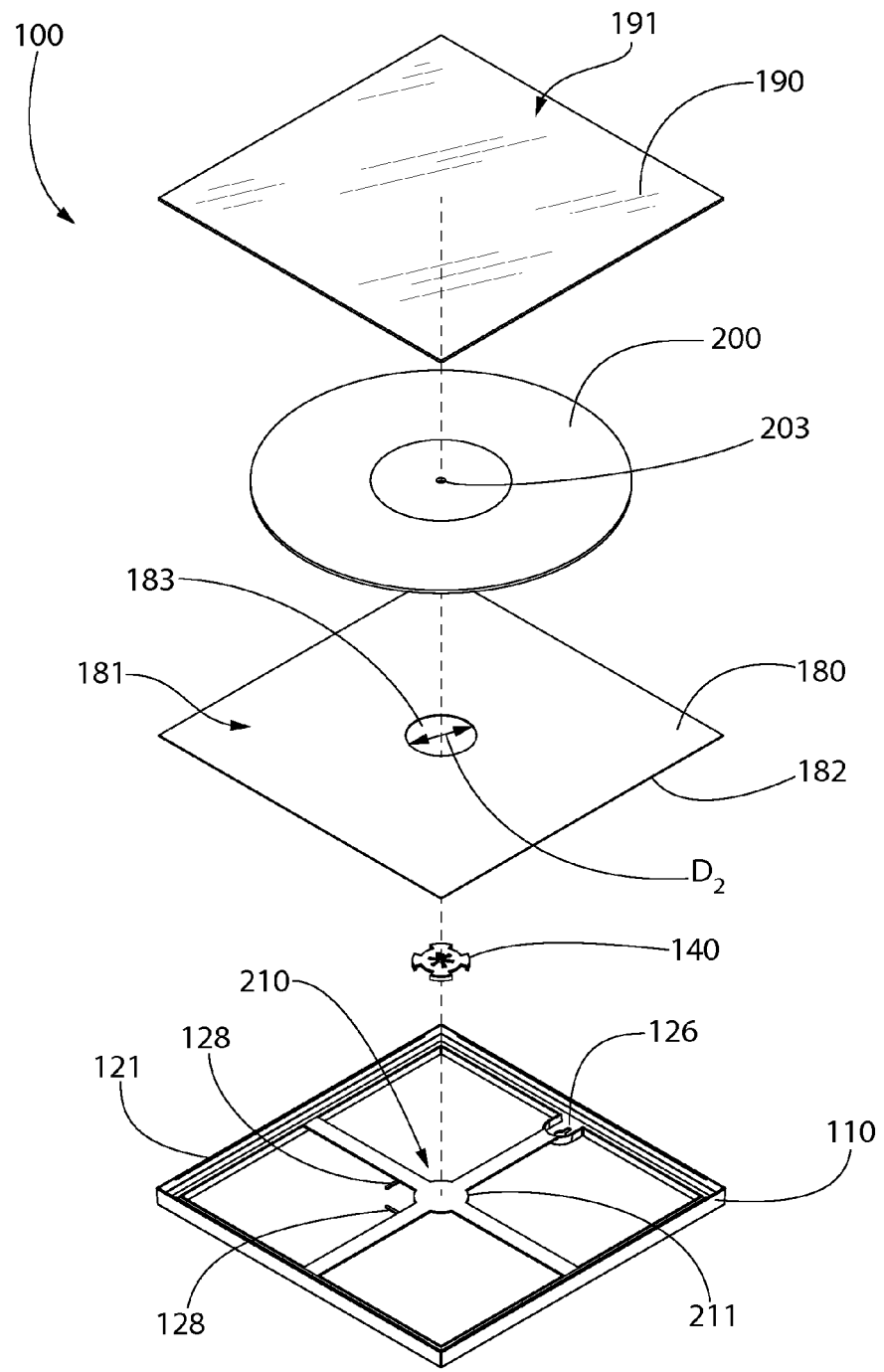
FIG. 2 is an exploded view of the frame assembly of FIG. 1.
Figure 8:
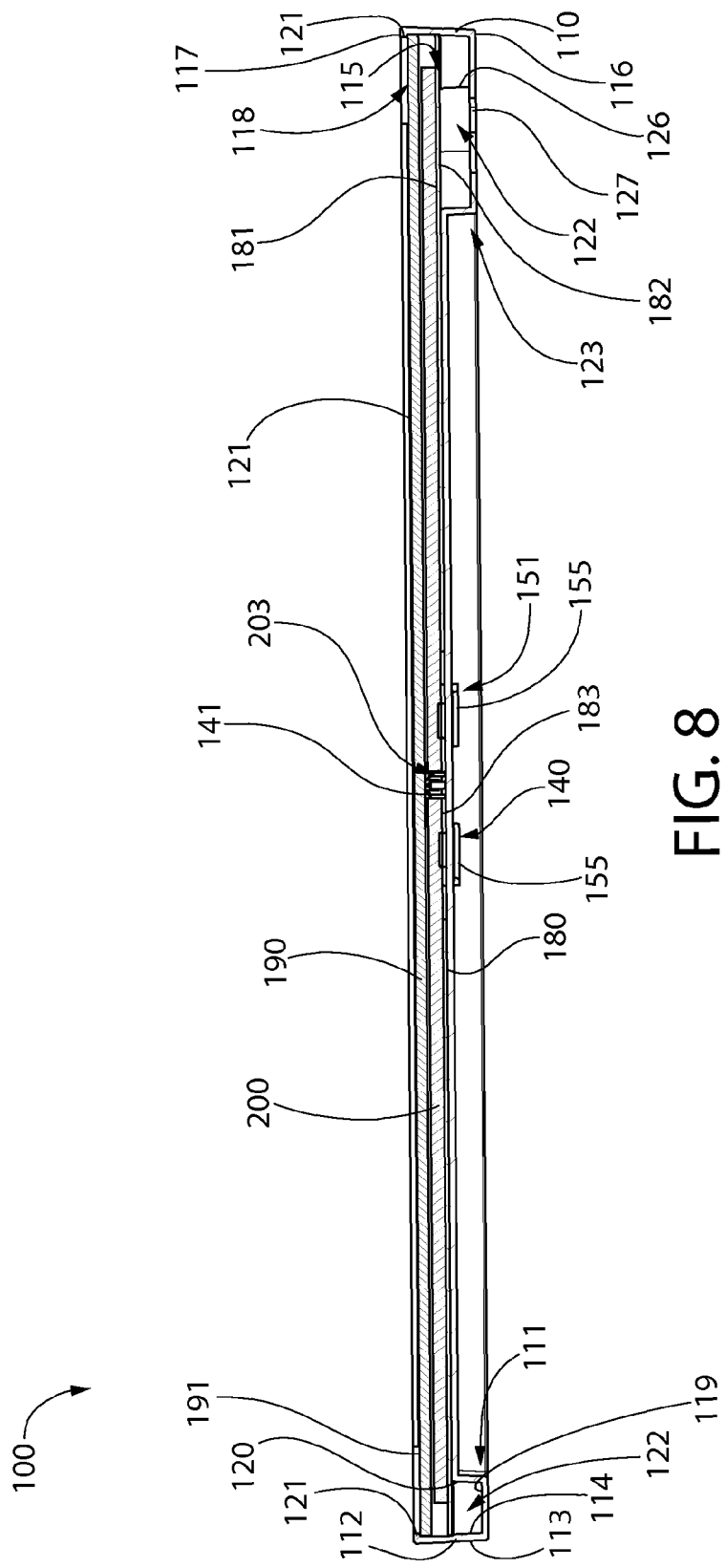
FIG. 8 is a cross-sectional view taken along line VIII-VIII of FIG. 1.

Referring first to FIGS. 1, 2, and 8 concurrently, a frame assembly 100 will be described in accordance with an embodiment of the present invention. The frame assembly 100 generally comprises a frame 110, a coupler 140, a backer panel 180, and a window panel 190. The frame assembly 100 is designed and configured to frame and display a flat article 200. In certain embodiments, the flat article 200 may be an article that has an opening formed therethrough, such as a record album (i.e., vinyl record, gramophone record, or the like), a compact disc (CD), a digital video disc or digital versatile disc (DVD), or some other audio, video, or digital storage device that includes a solid portion having a hole or opening therein. Of course, it will be appreciated from the description below that the frame assembly 100 can also be used to frame and display other flat articles including those that do not have holes or openings therein, such as album covers or the like. Thus, the frame assembly 100 is versatile in the types of items that it can frame and display.

In addition to displaying the flat article 200, the frame 110 also protects the flat article 200 against damage so that the integrity and pristine condition of the flat article 200 can be maintained even while displaying the flat article 200 for viewing. In that regard, in the fully assembled frame assembly 100 the flat article 200 may be sandwiched between the window panel 190 and the backer panel 180 so that the window panel 190 protects a front surface of the flat article 200 and the backer panel 180 protects a rear surface of the flat article 200. As will be appreciated from the description below, the frame 110 is a front-loading frame such that the flat article 200 to be displayed, the backer panel 180, and the window panel 190 are inserted through the front viewing side of the frame 110. The backer panel 180, the window panel 190, and the flat article 200 are then retained within the frame 110 by a locking feature of the frame 110 described in more detail below. This is different than conventional frames in which the article to be displayed is inserted into the frame through the rear, non-viewing side of the frame.

The window panel 190 can be any type of glazing that is commonly used for framing. In certain embodiments, the window panel 190 may be a panel of glass, acrylic, plexiglass, polystyrene or other material that allows the viewing of the flat article 200 therethrough. Of course, other materials can be used for the window panel 190 in other embodiments of the invention. In some embodiments, the window panel 190 may have a thickness of approximately 2 mm. In certain embodiments, when the frame assembly 100 is fully assembled the window panel 190 is positioned atop of the flat article 200. Thus, the viewer must be able to see through the window panel 190 in order to view the flat article 200. In this regard, it is preferable that the window panel 190 be colorless and transparent or formed of a transparent material, although this is not required and in certain other embodiments the window panel 190 may be translucent and/or have a slight colored tint to create a desired aesthetic. In certain embodiments, as used herein the term "transparent" may include the presence of colored tint. In other embodiments, the window panel 190 may be at least partially translucent. The window panel 190 provides protection to the front surface of the flat article 200 being displayed while still permitting a viewer to see the flat article 200 within the frame assembly 100. However, it should be appreciated that in certain other embodiments, the window panel 190 may be omitted from the frame assembly 100.

The backer panel 180 can be formed of any type of material desired. Specifically, the backer panel 180 may be formed of a hard or soft plastic material, such as thermoplastics including without limitation polymers and copolymers of styrene (i.e., polystyrene), ethylene, propylene (i.e., polypropylene), olefins, butadiene, vinyl compounds and polyesters, such as polyethylene terephthalate. In other embodiments the backer panel 180 may be formed of a paper or cardboard material. In still other embodiments the backer panel 180 may be formed of wood, metal or any other material as desired. The backer panel 180 serves to protect the rear surface of the flat article 200 against damage while the flat article 200 is displayed by or retained within the frame 110. In certain embodiments, the backer panel 180 may be altogether omitted if desired.

In the exemplified embodiment each of the window panel 190 and the backer panel 180 is square or rectangular in shape. Specifically, in the exemplified embodiment the frame 110 is a 12 inch by 12 inch square frame (or a 12.5 inch by 12.5 inch square frame), and each of the window panel 190 and the backer panel 180 is an approximately 12 inch by 12 inch square (or 12.5 inch by 12.5 inch, or the like). However, the invention is not to be so limited and the window panel 190 and the backer panel 180 can take on any desired shape. In certain embodiments it is merely preferred that the window panel 190 have the same shape as a display opening of the frame 110 to assist in retaining the window panel 190 within a display cavity of the frame 110, which will be discussed in more detail below.

In the exemplified embodiment, the backer panel 180 comprises a front surface 181, a rear surface 182, and an opening 183 extending through the backer panel 180. The opening 183 in the backer panel 180 has a second diameter $D_2$ that permits a retaining element of the coupler 140 to extend through the opening 183 (and in certain embodiments the entire coupler 140 to extend through the opening 183) as described below. Although in the exemplified embodiment the opening 183 is a circular-shaped opening, the invention is not to be so limited and the opening 183 can have a polygonal shape such as a square, a rectangle, or the like. In such embodiments the diameter may be considered the length of the largest side or any diagonal length of the opening 183.

Referring now to FIGS. 1-3 and 8 concurrently, the frame assembly 100, and more particularly the frame 110 of the frame assembly 100, will be further described. The frame 110 may be formed as an integral and monolithic structure in some embodiments such that all of the components of the frame 110 discussed herein below are formed together as a single unitary structure. This can be accomplished via an injection molding technique, extrusion, or any other desired manner. Of course, the invention is not to be so limited and in other embodiments the various components of the frame 110 may be separately formed and coupled together during a later stage in the manufacturing process via adhesion, fasteners, welding or the like. The frame 110 may be formed of any desirable material, including without limitation polystyrene such as high impact molding grade polystyrene (such as that having a density of 1.06 g/cm³), other hard plastics including polyethylene, polyvinyl chloride, nylon, thermoplastics, elastomers or the like. In still other embodiments the frame 110 may be formed of wood, metal or other similar materials.

The frame 10 generally comprises a floor structure 111 and an outer annular wall 112 coupled to and surrounding the floor structure 111. The outer annular wall 112 comprises an outer surface 113 that defines a periphery of the frame 110, an inner surface 114 that defines a display cavity 115, a rear edge 116 that is coupled to the floor structure 111, and a front edge 117 that defines a display opening 118. The floor structure 111 generally comprises a floor 119 extending inward from the outer annular wall 112, and an inner annular wall 120 protruding from the floor 119 and into the display cavity 115.

As noted above, the outer annular wall 112 comprises the outer surface 113 which defines a periphery of the frame 110. Thus, the outer annular wall 112 dictates the shape of the frame 110. In the exemplified embodiment, the frame 110 has a square or rectangular shape. However, the invention is not to be so limited in all embodiments and in certain other embodiments the frame 110 may have any other shape including circular, triangular, pentagonal, hexagonal, heptagonal, octagonal, nonagonal, decagonal, hendecagonal, dodecagonal or the like.

Furthermore, in the exemplified embodiment the front edge 117 defines the display opening 118 of the frame 110. The display opening 118 is sized, shaped and configured so that the backer panel 180, the flat article 200, and the window panel 190 can pass through the display opening 118 and into the display cavity 115. Thus, the frame 110 is a front-loading frame such that the backer panel 180, the window panel 190, and the flat article 200 are inserted through the display opening 118 formed by the front edge 117 of the outer annular wall 112. Once inserted into the display opening 118, the backer panel 180, the window panel 190, and the flat article 200 are retained in place by a combination of the floor structure 110 and a locking feature 121, which will be described in more detail below. In certain embodiments additional spacer panels may also be included to ensure that the components/structures positioned within the frame are adequately secured therein by the locking feature 121.

In the exemplified embodiment the display opening 118 is square or rectangular in shape but it can take on any of the polygonal shapes noted above as necessary to display a flat article having any shape desired. Alternatively, the display opening 118 may be circular in shape. The shape of the window panel 190 and the backer panel 180 can be modified depending on the shape of the flat article 200 and the shape of the display opening 118. The display opening 118 need not have the same shape as the periphery of the frame in all embodiments, and in certain embodiments the periphery of the frame may be any polygonal shape while the display opening 118 may be circular or a different polygonal shape.

The outer surface 113 of the outer annular wall 112 extends between the rear edge 116 of the outer annular wall 112 and the front edge 117 of the outer annular wall 112. Due to its dimensions, the outer annular wall 112 is able to have a certain degree of flexibility/resiliency inwardly towards and outwardly away from the display cavity 115, thus facilitating insertion of the backer panel 180 and the window panel 190 into the display cavity 115 through the display opening 118.

As noted above, the floor structure 110 comprises a floor 111 that extends inwardly from the outer annular wall 112 in a direction of the display cavity 115. More specifically, the floor 111 extends from the rear edge 116 of the outer annular wall 112 inwardly towards the inner annular wall 120. The inner annular wall 120 extends upwardly from the floor 111 into the display cavity 115. In the exemplified embodiment the inner annular wall 120 is a continuous upstanding wall that extends upwardly from the floor 111 and forms a closed loop, although the invention is not to be so limited in all embodiments and the inner annular wall 120 may be a discontinuous wall comprising wall segments adjacent ones of which are spaced apart by a gap. In still other embodiments the inner annular wall 120 may be omitted.

The inner annular wall 120 of the floor structure 110 is spaced apart from the outer annular wall 112 by an annular gap 114. If desired to increase structural rigidity of the frame 110, additional ribs may be included that are positioned within the annular gap 114 between the inner and outer annular walls 120, 11. The inner annular wall 120 defines a rear opening 123 of the frame 110. More specifically, the location at the intersection of the outer surface of the floor 111 and the inner annular wall 120 defines the rear opening 123. In certain embodiments, the rear opening 123 may be omitted and the rear surface of the floor 111 may extend across the entirety of the rear opening 123 thereby enclosing the rear of the frame 110.

Furthermore, in the exemplified embodiment the frame 110 includes a first strut 124 connected to the inner annular wall 120 on opposite sides of the rear opening 123 and a second strut 125 connected to the inner annular wall 120 on opposite sides of the rear opening 123. More specifically, the first strut 124 extends across the display cavity 115 from a first side of the display cavity 115 to a second opposite side of the display cavity 115. The second strut 125 extends across the display cavity 115 from a third side of the display cavity 115 to a fourth opposite side of the display cavity 115. Of course, in alternate embodiments one or more struts could be used or the struts could be altogether omitted.

When used, the struts 124, 125 provide further structural integrity to the frame 110. In the exemplified embodiment, the first and second struts 124, 125 intersect one another in a perpendicular manner at a central location within the display cavity 115 of the frame 110. As will be discussed in more detail below, in the exemplified embodiment the intersection of the first and second struts 124, 125 forms at least a portion of a coupling member 210 of the frame 110, the coupling member 210 being the portion of the frame 110 to which the coupler 140 is attached during use. Of course, in other embodiments multiple struts may extend parallel to one another or may intersect one another at other than a perpendicular angle, or the struts may extend diagonally across the display cavity 115 from opposite corners of the frame 110. In the exemplified embodiment the first and second struts 124, 125 are coupled to the inner annular wall 120 at an upper edge thereof. However, in other embodiments the first and second struts 124, 125 may be coupled to the inner annular wall 120 along any portion of an inner surface of the inner annular wall 120.

Furthermore, in the exemplified embodiment the frame 110 further comprises a connector 126 extending inwardly from the inner surface of the inner annular wall 120 into the display cavity 115. However, the invention is not to be so limited in all embodiments and the connector 126 may be altogether omitted in some embodiments, and in still other embodiments two or more of the connectors 126 may be present. The connector 126 comprises an opening 127 therethrough. The connector 126 is intended to facilitate hanging the frame 110 from a vertical surface such as a wall. Specifically, a nail can be inserted into a vertical surface and then the frame 110 can be positioned so that the nail extends through the opening 127 of the connector 126. Alternatively, a screw can be screwed into the vertical surface through the opening 127 to support the frame 110 on a vertical surface. Thus, the connector 126 facilitates coupling of the frame 110 to a vertical wall when such is desired. In the exemplified embodiment, one end of the second strut 125 is coupled to the connector 126, although the second strut 125 can be positioned at other locations along the inner surface of the inner annular wall 120 in other embodiments as noted herein above.

As noted above, the frame 110 also comprises a locking feature 121. The locking feature 121 is located on the inner surface 114 of the outer annular wall 112. In the exemplified embodiment, the locking feature 121 is a protrusion or tab extending from the inner surface 114 of the outer annular wall 112 inwardly towards the display cavity 115. More specifically, in the exemplified embodiment the locking feature 121 comprises a tab on each of the four sides of the frame 110, although the invention is not to be so limited in all embodiments and some of the sides of the frame 110 may not include a tab in other embodiments. Each of the tabs is an elongated feature that juts out or extends from the inner surface 114 of the outer annular wall 112 inwardly towards the display cavity 115 in a continuous manner. However, the invention is not to be so limited and each of the tabs can be formed by non-continuous protruding features or the like. In one embodiment, each of the tabs of the locking feature 121 is flush with the front edge 117 of the outer annular wall 112, although this is not required in all embodiments. In certain embodiments, the locking feature 121 is merely positioned adjacent the front edge 117 of the outer annular wall 112.

As noted above, the frame 110 is a front-loading frame such that the backer panel 180, the window panel 190, and the flat article 200 are inserted into the display cavity 115 through the display opening 118 located at the front edge 117 of the outer annular wall 112. Thus, when it is desired to insert the backer panel 180 and the window panel 190, with or without the flat article 200, into the display cavity 115, the backer panel 180 and the window panel 190 are positioned adjacent the display opening 118 and pressed inwardly towards the display cavity 115. As the backer panel 180 and the window panel 190 are pressed inwardly towards the display opening 118, the tabs of the locking feature 121 contact the backer panel 180 and the window panel 190. However, due to the flexibility/resiliency of the outer annular wall 112 as discussed above, the backer panel 180 and the window panel 190 are able to be pushed passed the tabs of the locking feature 121 so as to enter into the display cavity 115.

More specifically, in certain embodiments one or more of the backer panel 180 and the window panel 190 has a length and width that is substantially the same as the length and width of the display opening 118 and the display cavity 115. However, the tabs of the locking feature 121 extend inwardly from the inner surface 114 of the outer annular wall 112 towards the display cavity 115. The distance between opposing ones of the tabs is less than the length and/or width of the backer panel 180 and/or the window panel 190. Thus, when inserting the backer panel 180 and the window panel 190 through the display opening 118, the outer annular wall 112 flexes slightly to permit the backer panel 180 and the window panel 190 to enter into the display cavity 115. Once the backer panel 180 and the window panel 190 passes by the tabs of the locking feature 121, the outer annular wall 112 snaps or biases back into its original shape/form, thus snap-locking the backer panel 180 and the window panel 190 within the display cavity 115.

Once located within the display cavity 115, the tabs of the locking feature 121 are positioned adjacent, or in some instances into contact with a front surface 191 of the window panel 190. Thus, the locking feature 121 snap-locks the backer panel 180 and the window panel 190 (and the flat article 200) within the display cavity 115 to retain the backer panel 180 and the window panel 190 within the display cavity 115.

Although the exemplified embodiment depicts the locking feature 121 comprising the locking tabs extending from the outer annular wall 112 and into the display cavity 115, the invention is not to be so limited in all embodiments. In certain other embodiments, the locking feature 121 may comprise one or more slots or depressions formed into the inner surface 114 of the outer annular wall 112. In such an embodiment, the backer panel 180 and the window panel 190 may include tabs extending from their periphery. Thus, upon inserting the backer panel 180 and the window panel 190 through the display opening 118, the tabs of the window panel 190 will be inserted into the slots or depressions formed into the inner surface 114 of the outer annular wall 112.

In still other embodiments, the locking feature 121 may include fasteners that are pivotably or rotatably coupled to the outer annular wall 112. In such an embodiment, the backer panel 180 and the window panel 190 can be inserted into the display cavity 115 through the display opening 118 and once positioned within the display cavity 115 the fasteners can be pivoted or rotated so as to prevent the backer panel 180 and the window panel 190 from falling out of the display cavity 115. Thus, the fasteners can be pivotable between a first position in which the fasteners extend from the outer annular wall 112 in a manner and direction so as not to block the display opening 118 and a second position in which the fasteners extend from the outer annular wall 112 in a manner and direction so as to block the display opening 118. Furthermore, other features and components can be used as the locking feature 121 within the scope of the present invention as would be understood by person of ordinary skill in the art.

Referring back to the exemplified embodiment, when the backer panel 180 and the window panel 190 are positioned within the display cavity 115, the locking feature 121 snap-locks the backer panel 180 and the window panel 190 within the display cavity 115. When the backer panel 180 and the window panel 190 are positioned within the display cavity 115, the backer panel 180 is positioned adjacent to the floor structure 110, and more specifically adjacent to the upper surface of the inner annular wall 120. Thus, upon being snap-locked into the display cavity 115, the backer panel 180 and the window panel 190 are positioned/trapped between the tabs of the locking feature 121 and the upper edge of the inner annular wall 120. In some embodiments, the tabs of the locking feature 121 are in surface contact with the front surface 191 of the window panel 190 and the upper edge of the inner annular wall 120 is in surface contact with the rear surface 182 of the backer panel 180. Thus the combination of the floor structure 110, and more specifically the inner annular wall 120 of the floor structure 110 and the locking feature 121, facilitate securely retaining the backer panel 180 and the window panel 190 (and the flat article 200) within the display cavity 115. In some embodiments, there may be a small gap between the tabs of the locking feature 121 and the front surface 191 of the window panel 190 while the rear surface 182 of the backer panel 180 is in contact with the upper edge of the inner annular wall 120 when the backer panel 180 and the window panel 190 are retained within the display cavity 115. The backer panel 180 may also rest against the first and/or second struts 124, 125 when positioned in the display cavity 115.

As noted above, in the exemplified embodiment at the intersection of the first and second struts 124, 125 is a coupling member 210. The coupling member 210 is the feature or structure of the frame 110 to which the coupler 140 is attached, which will be described in more detail below with specific reference to FIGS. 4A and 4B. The coupling member 210 comprises a mating feature 211, and in the exemplified embodiment is formed as a circular shaped feature located at the intersection of the first and second struts 124, 125. Furthermore, in the exemplified embodiment the coupling member 210 includes a portion of the first and second struts 124, 125.

In the exemplified embodiment the first and second struts 124, 125 divide the display cavity 115 into four quadrants. The mating feature 211 of the coupling member 210 is formed by an arcuate edge 212 that extends between the first and second struts 124, 124 in each of the four quadrants. Thus, the first and second struts 124, 125 are elongated, flat, rectangular structures that intersect one another, and the coupling member 210 is formed by the intersection of the first and second struts 124, 125 and by the arcuate edges 212 extending between the first and second struts 124, 125.

Of course, the coupling member 210 can be formed in other manners than that illustrated herein. Specifically, the coupling member 210 may in certain embodiments be formed by the intersection of the first and second struts 124, 125 without also including the arcuate edge 212. In other embodiments the coupling member 210 can be formed as an opening in a floor of the frame 110. Specifically, the frame 110 may have a floor that extends along an entirety of the display cavity 115. In such an embodiment, an opening in the floor may form the coupling member, and the coupler 140 will be configured to be coupled to this coupling member. Thus, the coupling member 210 can take on any form that permits the coupler 140 to be affixed thereto during assembly of the frame assembly 100, as discussed in more detail below.

Figure 3:
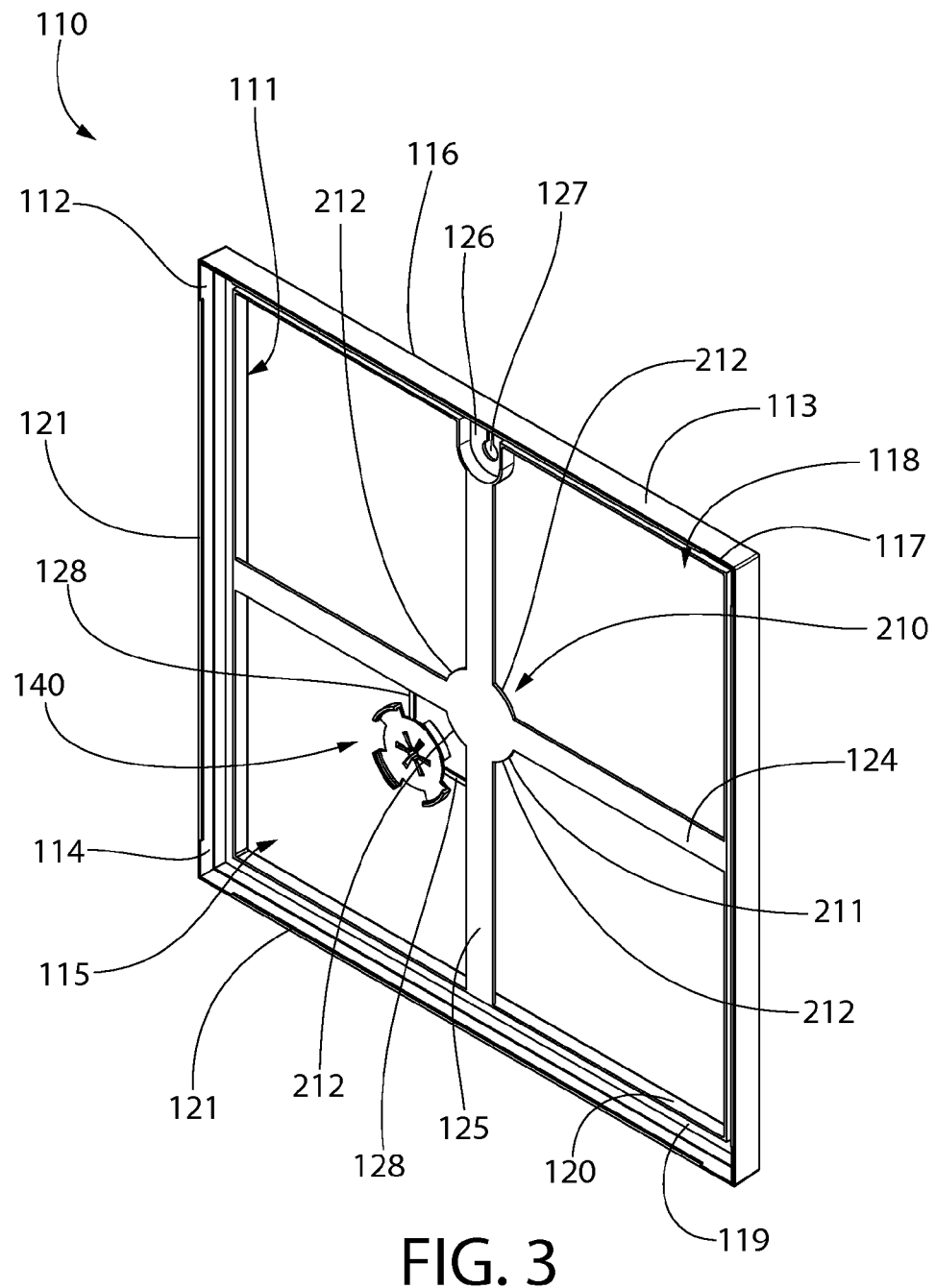
FIG. 3 is a perspective view of a frame of the frame assembly of FIG. 1.

The coupler 140 is the component that permits coupling between the frame 110 and the flat article 200. Thus, the coupler 140 can be coupled to the frame 110, and the flat article 200 can be coupled to the coupler 140. As can be seen in FIG. 3, before use of the frame assembly 100 the coupler 140 is connected to the first and second struts 124, 125 by connecting arms 128. The coupling arms 128 are thin structures that retain the coupler 140 in place affixed to the first and second struts 124, 124 so that the coupler 140 remains with the frame 110 at all times from manufacturing until purchase and use by a user. When it is desired to assemble the frame assembly 100, the coupler 140 can be separated from the frame 110 easily by twisting and pulling the coupler 140 relative to the frame 110 to separate the coupler 140 from the connecting arms 128.

Figure 9:
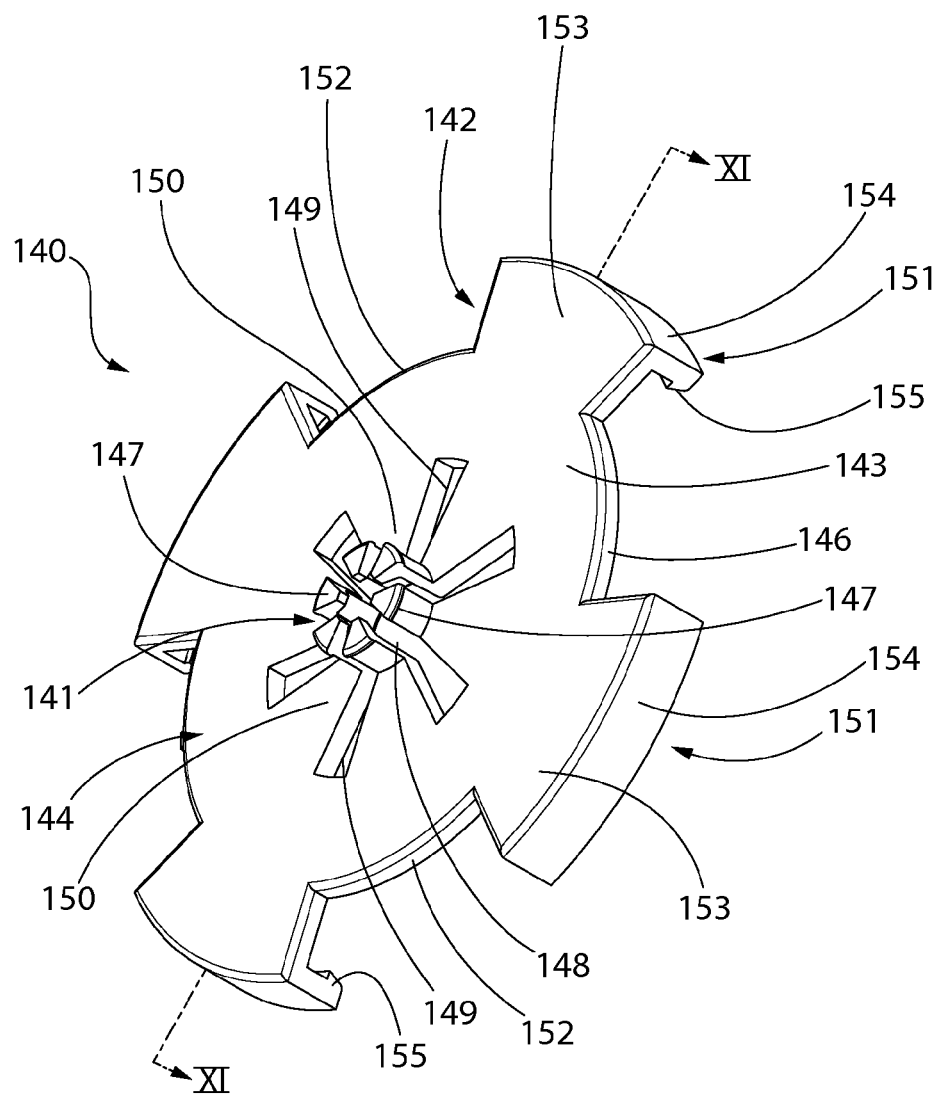
FIG. 9 is a front perspective view of the coupler of FIGS. 4A and 4B.
Figure 10:
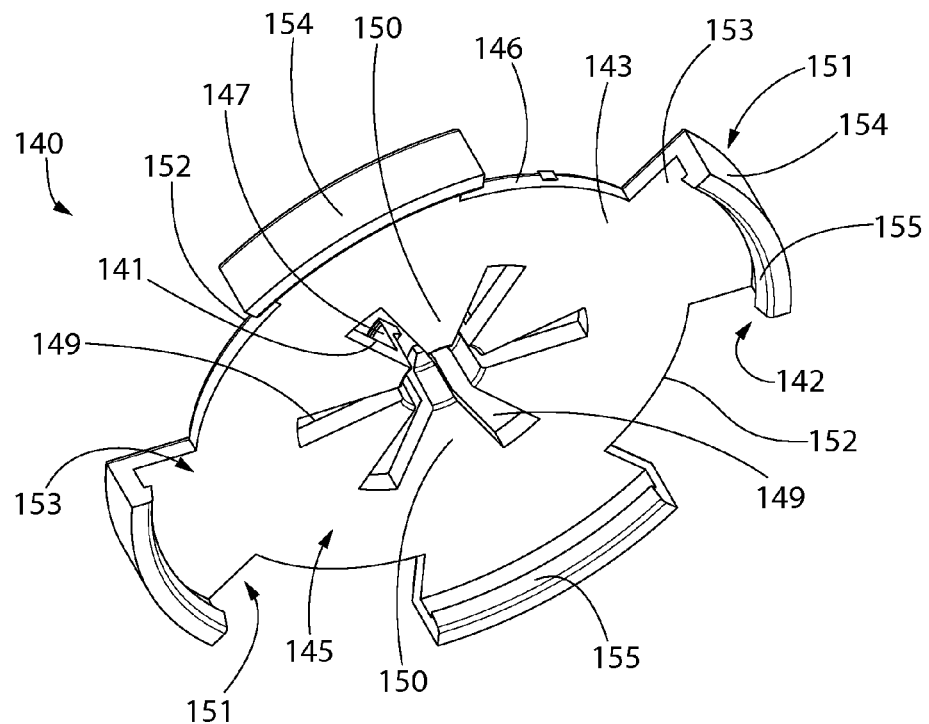
FIG. 10 is a rear perspective view of the coupler of FIG. 9.
Figure 11:
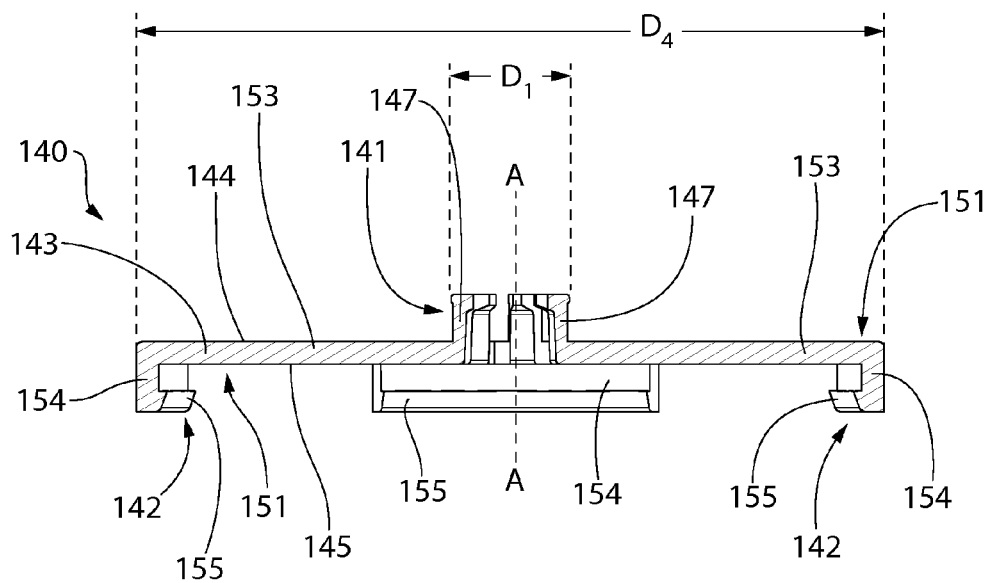
FIG. 11 is a cross-sectional view taken along line XI-XI of FIG. 9.

Referring briefly to FIGS. 9-11, the details of the coupler 140 will be described. As noted above, the coupler 140 is the component that permits coupling between the frame 110 and the flat article 200 being displayed by the frame. Specifically, the coupler 140 permits coupling between the frame 110 and the flat article 200 when the flat article 200 is a CD, DVD, record album, vinyl record, or the like (i.e., a media storage device with a hole therethrough). In that regard, the coupler 140 comprises a retaining element 141 for coupling the coupler 140 to the flat article 200 and a mounting element 142 for mounting the coupler 140 to the frame 110. More specifically, the coupler 140 comprises a body 143, and the retaining element 141 and the mounting element 142 extend from the body 142.

The body 143 of the coupler 140 comprises a front surface 144, a rear surface 145, and a peripheral surface 146 extending between the front and rear surfaces 144, 145. The retaining element 141 extends upwardly from the front surface 144 of the body 143. More specifically, the retaining element 141 comprises a plurality of teeth 147 that extend from the front surface 144 of the body 143 in a spaced-apart manner about a central axis A-A. Specifically, the teeth 147 are arranged radially about the central axis A-A. Adjacent ones of the teeth 147 are spaced apart from one another along at least a portion of the length of the teeth 147 by a gap 148. The outer surfaces of the teeth 147 collectively define an outer surface of the retaining element 141. The outer surface of the retaining element 141 has a circular shape, although other shapes are possible in other embodiments. Furthermore, the retaining element 141 of the coupler 140 has a first diameter $D_1$ measured at the collective outer surfaces of the teeth 147. Furthermore, the coupler 140 has a fourth diameter $D_4$ measured as the diameter of a reference circle that includes the outermost edges of the coupler 140.

The body 143 comprises a plurality of slits 149 formed therein that extend through the body 143 from the front surface 144 to the rear surface 145 thereby forming openings through the body 143. The slits 149 extend radially from the central axis A-A towards the peripheral surface 146 of the body. Furthermore, each of the slits 149 is aligned with one of the gaps 148 between adjacent teeth 147. Due to the gaps 148 and the slits 149, the body 143 comprises a flexible hinge portion 150 between each pair of adjacent slits 149. Furthermore, one of the teeth 147 extends from a terminal end of each of the flexible hinge portions 150 of the body 143. Due to the combination of the gaps 148 and the slits 149, each of the teeth 147 is able to flex radially inwardly towards the central axis A-A and to bias back into its original position. This facilitates coupling the flat article 200 to the retaining element 141 of the coupler 140 as described in more detail below.

The mounting element 142 of the coupler 140 comprises a plurality of flanges 151 that extend from the peripheral surface 146 of the body 143 outwardly in a direction away from the central axis A-A. In the exemplified embodiment, the mounting element 142 comprises four of the flanges 151. However, more or less than four flanges 151 can be used in other embodiments depending on the structure of the coupling member 210 of the frame 110 and to ensure that the coupler 140 can be readily coupled to the coupling member 210 of the frame 110. The flanges 151 are spaced apart about the peripheral surface 146 of the body 143 leaving spaced-apart first portions 152 of the peripheral surface 146 of the body 143 exposed between adjacent ones of the flanges 151 (whereas second portions of the peripheral surface 146 of the body 143 are covered by the flanges 151 and thus not exposed). In the exemplified embodiment, each of the flanges 151 comprises a horizontal wall 153 that is flush with both the front and rear surfaces 144, 145 of the body 143 and a mating arm 154 extending downwardly from the horizontal wall 153 in a direction away from the rear surface 145 of the body 143. An inner surface of each of the mating arms 154 has a locking feature 155 protruding therefrom to facilitate the coupling of the coupler 140 to the coupling member 210 of the frame 110. More specifically, the locking feature 155 extends from the inner surface of the mating arms 154 in the direction of the central axis A-A. The locking feature 155 facilitates releasably attaching the coupler 140 to the coupling member 210 of the frame 110, as discussed in more detail below.

Figure 4A:
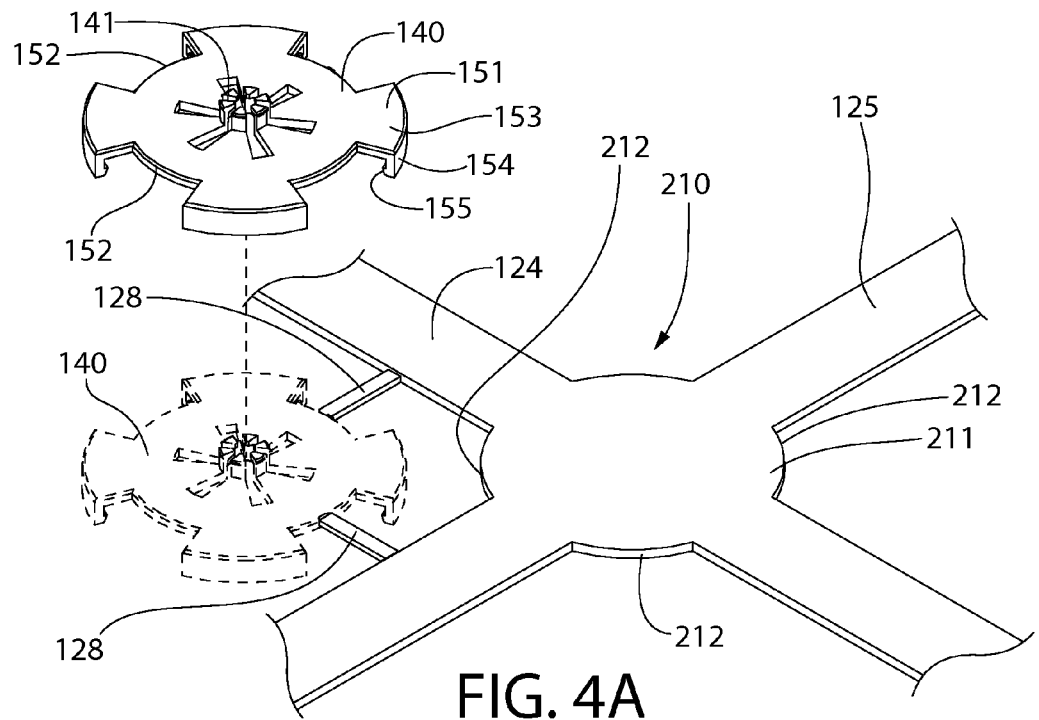
FIG. 4A illustrates the process of separating a coupler from its coupling to one or more struts of the frame.
Figure 4B:
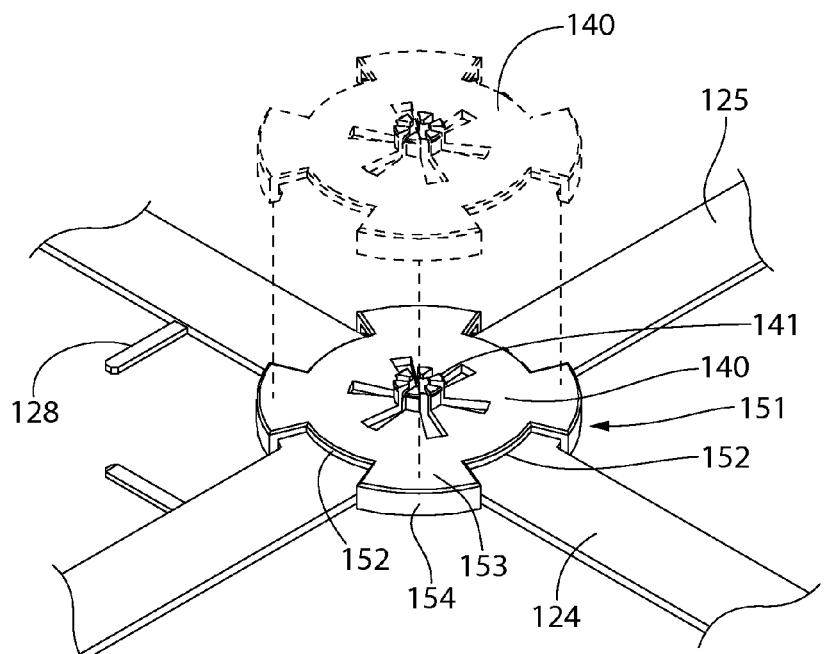
FIG. 4B illustrates the process of coupling the coupler to a coupling member of the frame.

Referring to FIGS. 4A-8, the assembly of the frame assembly 100 will be described in accordance with an embodiment of the present invention in which the frame 110 is used to frame a record album (or vinyl record or the like) as the flat article 200. This assembly process will be described referring first to FIGS. 4A, 4B, and 8 concurrently. As noted above, during manufacturing and up until first use by the user, the coupler 140 is connected to the first and second struts 124, 125 by the connecting arms 128. A user can use force or torque to separate the coupler 140 from the connecting arms 128 as illustrated in FIG. 4A.

Once the coupler 140 is separated from the connecting arms 128, the coupler 140 can be coupled (i.e., non-fixedly attached or releasably coupled) to the coupling member 210 of the frame 110. Specifically, the coupler 140 is oriented relative to the frame so that the flanges 151 of the coupler 140 are aligned with the arcuate edges 212 of the coupling member 210. The coupler 140 is then pressed down towards the frame 110 until the rear surface 145 of the body 143 of the coupler 140 is in contact with the coupling member 210 of the frame 110. In this position, the flanges 151 are aligned with and positioned atop of the coupling member 210 and the mating arms 154 of the coupler 140 are engaged against the arcuate edges 212 of the coupling member 210. Furthermore, the locking feature 155 of the mating arms 154 traps the coupling member 210 between the locking feature 155 and the horizontal wall 153 of the flange 151. Thus, the locking feature 155 snap-locks the coupler 140 to the coupling member 210. A user can separate the coupler 140 from the coupling member 210 by pulling on the coupler 140 while maintaining the frame 110 stationary (or vice versa). Thus, the coupler 140 can be readily and easily coupled to and decoupled from the coupling member 210 of the frame 110.

When the coupler 140 is coupled to the coupling member 210, the first portions 152 (i.e., exposed portions) of the peripheral surface 146 of the body 143 of the coupler 140 are aligned with the first and second struts 124, 125 and the flanges 151 are aligned with the arcuate edges 212 of the mating feature 211 of the coupling member 210. Thus, each of the mating arms 154 is engaged with one of the arcuate edges 212 and the first and second struts 124, 125 extend between each set of adjacent flanges 151. When the coupler 140 is coupled to the coupling member 210 of the frame 110, the retaining element 141 of the coupler 140 protrudes upwardly into the display cavity 115 of the frame 110 to permit coupling of the coupler 140 to the flat article 200.

Figure 5:
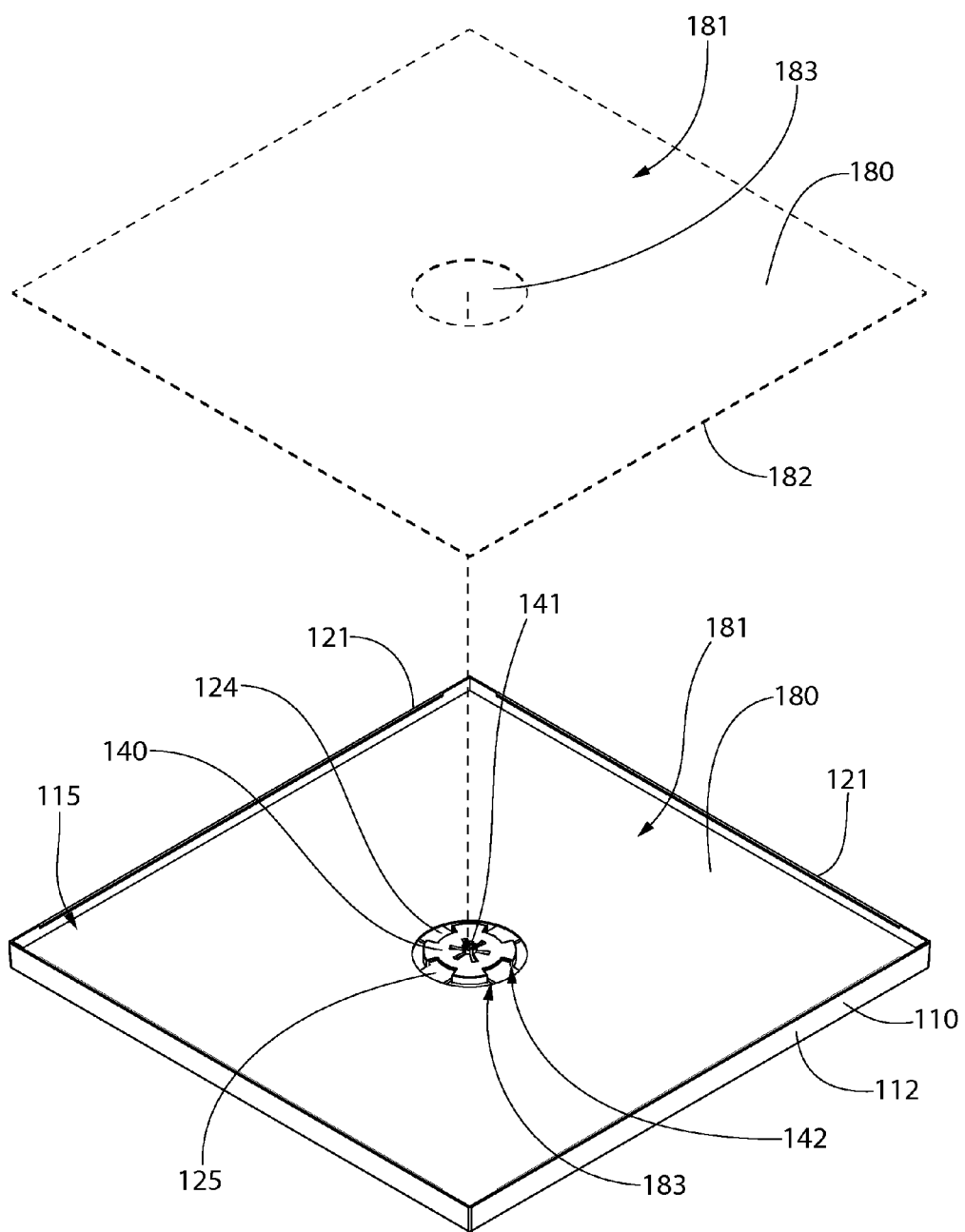
FIG. 5 illustrates the process of positioning a backer panel within the frame.

Referring to FIGS. 5 and 8, after the coupler 140 is coupled to the frame 110, the backer panel 180 may be positioned into the display cavity 115. It should be appreciated that in certain embodiments the backer panel 180 may be omitted from the frame assembly 100 and that the flat article 200 may be the first item positioned into the display cavity 115 after the coupler 140. In embodiments that include the backer panel 180, the backer panel 180 is merely inserted into the display cavity 115 so that the opening 183 of the backer panel 180 is aligned with the coupler 140. In the exemplified embodiment, the second diameter $D_2$ of the opening 183 of the backer panel 180 is greater than the fourth diameter $D_4$ of the coupler 140, and thus even with the backer panel 180 in the display cavity 115 the entirety of the coupler 140 is exposed. However, the invention is not to be so limited in all embodiments and the second diameter $D_2$ of the opening 183 of the backer panel 180 may be less than the fourth diameter $D_4$ of the coupler. However, the second diameter $D_2$ of the opening 183 of the backer panel 180 must be greater than or equal to the first diameter $D_1$ of the retaining element 141 so that when the backer panel 180 is positioned in the display cavity 115, the retaining element 141 extends through the opening 183 of the backer panel 180. This ensures that the retaining element 141 is exposed and available for coupling with the flat article 200, as described below.

Figure 6:
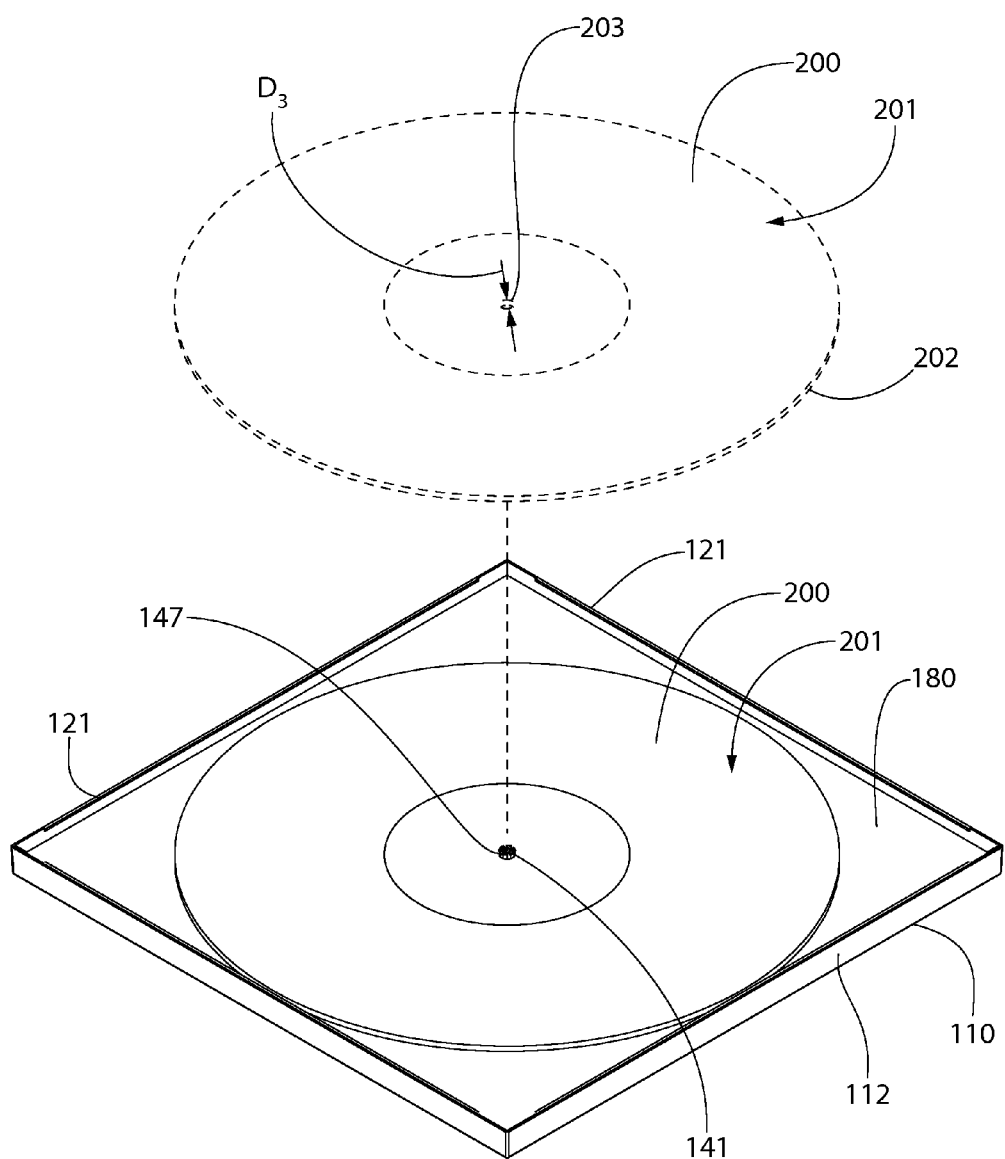
FIG. 6 illustrates the process of positioning a flat article within the frame.

Referring to FIGS. 6 and 8 concurrently, after the backer panel 180 is inserted into the display cavity 115 (or if the backer panel 180 is omitted, this can be done directly after the coupler 140 is coupled to the coupling member 210), the flat article 200 is inserted into the display cavity 115. In the exemplified embodiment, the flat article 200 is a record album, such as a vinyl record, a gramophone record, a CD, some other format of a long play (LP) record, a DVD, or the like. Thus, the flat article 200 has a front surface 201, a rear surface 202, and an opening 203 extending through the flat article 200. The opening 203 in the flat article 200 has a third diameter $D_1$. The third diameter $D_3$ of the opening 203 is greater than or equal to the first diameter $D_1$ of the retaining element 141 of the coupler 140. This permits the retaining element 141 to protrude through the opening 203 of the flat article 200 when the flat article 200 is inserted into the display cavity 115. In certain embodiments it is preferable that the first and third diameters $D_1$, $D_3$ are substantially the same for reasons that will be better understood from the description below.

As the flat article 200 is inserted into the display cavity 115, the retaining element 141 extends into and possibly protrudes through the opening 203 of the flat article 200. In certain embodiments, as the retaining element 141 extends into the opening 203, the teeth 147 of the retaining element 141 will flex or bend inwardly as discussed above to accommodate the diameter of the opening 203. The teeth 147 of the retaining element 141 will then bias back until the teeth 147 are in direct surface contact with the periphery of the opening 203 of the flat article 200. In this manner, the teeth 147 of the retaining element 141 will engage or contact the periphery of the opening 203 of the flat article 200 to assist in retaining the flat article 200 in position and coupling the flat article 200 to the coupler 140. This coupling between the flat article 200 and the coupler 140 is similar to that which is achieved with standard jewel CD cases. Because the retaining element 141 grips the flat article 200 by its opening 203, damage to the flat article 200 is prevented because the flat article 200 may be suspended within the display cavity 115.

In certain embodiments, the flat article 200 may be a record album or the like having a 12 inch diameter. As a result, if the length and width of the display cavity 115 is also 12 inches, the flat article 200 will fit relatively securely within the display cavity 115. However, in other embodiments the flat article 200 may have a smaller diameter than the length and width of the display cavity 115 (i.e., 10 inches). By using the retaining element 141 to secure the flat article 200 within the display cavity 115, the flat article 200 can remain suspended and/or centered within the display cavity 115 regardless of the orientation of the frame assembly 100.

Figure 7:
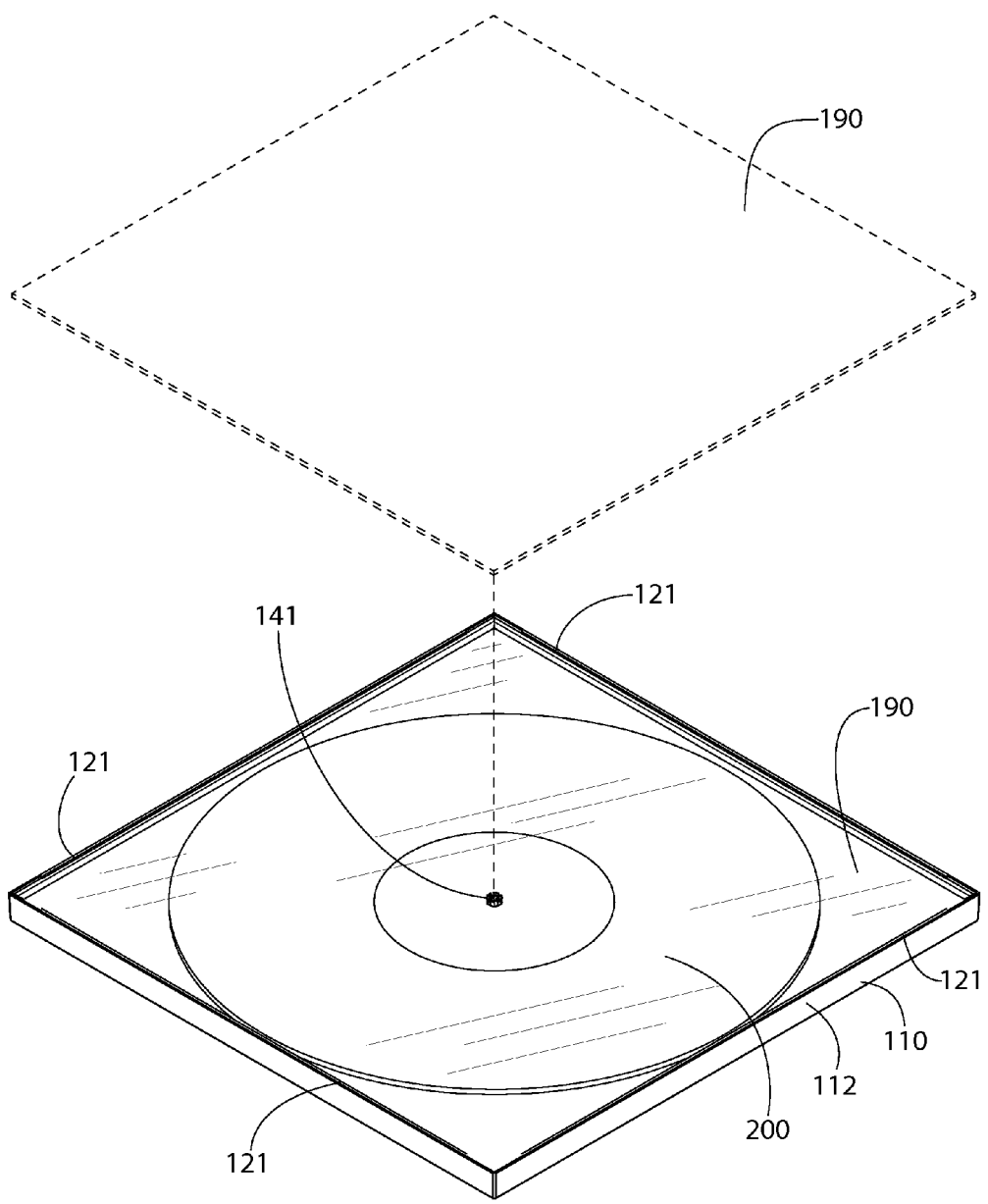
FIG. 7 illustrates the process of positioning a window panel within the frame.

Referring now to FIGS. 7 and 8 concurrently, after the flat article 200 is positioned within the display cavity 115, the window panel 190 is inserted into the display cavity 115 atop of the flat article 200. As described above, the locking feature 121 on the inner surface 114 of the outer annular wall 112 will engage/contact the window panel 190 to retain the window panel 190, the flat article 200, and the backer panel 180 within the display cavity 115.

Although the invention has been described herein in which the frame 110 is used to frame the flat article 200 having the opening 203 therein, the invention is not to be so limited in all embodiments. The frame 110 can be used to frame and display an article that does not have an opening, such as an album cover or any other item as may be desired. In certain embodiments when the article being framed does not have an opening, the coupler 140 may not be coupled to the frame 110. However, even with the coupler 140 coupled to the frame 110 an article without an opening may be positioned in the display cavity 115 due to the flexibility of the frame 110. Furthermore, in certain embodiments both a record album and an album cover may be included in the frame 110 simultaneously. In such an embodiment the record album (or flat article with an opening) will first be positioned in the display cavity 115 as described herein above and coupled to the coupler 140. After the record album or other flat article is properly secured in the frame 110, the album cover can be inserted into the frame 110. The frame 110 has sufficient resilience/flexibility to enable both a record album and album cover to be stored therein at the same time (although only the item that is positioned in the frame second, which is most likely to be the album cover, will be visible through the window panel 190).

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A frame assembly for displaying a flat article having an opening, the frame assembly comprising:
   a frame comprising:
      a floor structure;
      an outer annular wall coupled to and surrounding the floor structure, the outer annular wall comprising an outer surface defining a periphery of the frame, an inner surface defining a display cavity, a rear edge, and a front edge that defines a display opening configured to allow the flat article to pass therethrough into the display cavity;
      a locking feature on the inner surface of the outer annular wall adjacent the front edge; and
      a coupling member comprising a mating feature;
   a coupler comprising a retaining element and a mounting element, the mounting element of the coupler coupled to the mating feature of the coupling member of the frame so that the retaining element protrudes into the display cavity;
   a backer panel having an opening therethrough, the backer panel positioned in the display cavity adjacent to the floor structure, the retaining element of the coupler extending through the opening of the backer panel;
   the retaining element of the coupler configured to extend into the opening of the flat article and engage a periphery of the opening of the flat article to couple the flat article to the coupler when the flat article is positioned in the display cavity; and
   a window panel positioned in the display cavity, the locking feature on the inner surface of the outer annular wall retaining the window panel and the backer panel within the display cavity.

2. The frame assembly of claim 1 wherein the retaining element of the coupler has a first diameter and the opening in the backer panel has a second diameter, the second diameter being greater than the first diameter.

3. The frame assembly of claim 1 wherein the coupler comprises a body having a front surface, a rear surface, and a peripheral surface extending between the front and rear surfaces, the retaining element extending from the front surface of the body and the mounting element comprising a plurality of flanges extending from the peripheral surface of the body, each of the flanges having a mating arm extending in a direction away from the rear surface of the body that engages the mating feature of the coupling member of the frame and couples the coupler to the coupling member of the frame.

4. The frame assembly of claim 3 wherein the retaining element of the coupler comprises a plurality of teeth extending upwardly from the front surface of the body in a spaced-apart manner about a central axis, outer surfaces of the plurality of teeth collectively forming an outer surface of the retaining element.

5. The frame assembly of claim 4 wherein the outer surface of the retaining element of the coupler has a circular shape.

6. The frame assembly of claim 4 wherein adjacent ones of the plurality of teeth are spaced apart by a gap, and wherein the body comprises a plurality of slits extending radially from the central axis towards the peripheral surface of the body, each of the slits aligned with one of the gaps.

7. The frame assembly of claim 6 wherein the body comprises a flexible hinge portion between each pair of adjacent slits, and wherein one of the teeth extends from a terminal end of each of the flexible hinge portions of the body.

8. The frame assembly of claim 1, further comprising:
a first strut extending across the display cavity from a first side of the display cavity to a second side of the display cavity;
a second strut extending across the display cavity from a third side of the display cavity to a fourth side of the display cavity; and
wherein the mating feature of the coupling member is formed by the intersection of the first and second struts.

9. The frame assembly of claim 8 wherein the first and second struts divide the display cavity into four quadrants, and wherein the mating feature of the coupling member comprises an arcuate edge extending between the first and second struts in each of the four quadrants.

10. The frame assembly of claim 9 wherein the coupler comprises a body having a front surface, a rear surface, and a peripheral surface extending between the front and rear surfaces, the mounting element of the coupler comprising a plurality of flanges extending from the peripheral surface of the body in a spaced-apart manner so that first portions of the peripheral surface of the body are exposed, and wherein when the coupler is coupled to the mating feature of the coupling member the first portions of the peripheral surface of the body are aligned with the first and second struts and the flanges are aligned with the arcuate edges of the mating feature of the coupling member.

11. The frame assembly of claim 8 wherein the floor structure comprises a floor extending inward from the outer annular wall and an inner annular wall protruding from the floor into the display cavity, an annular gap existing between the inner annular wall and the outer annular wall.

12. The frame assembly of claim 11 wherein the inner annular wall defines a rear opening of the frame, and wherein each of the first and second struts are connected to the inner annular wall on opposite sides of the rear opening.

13. The frame assembly of claim 8 wherein the coupler is connected to the first and second struts of the frame by connecting arms prior to use of the frame assembly for storing and displaying the flat article.

14. A frame assembly for displaying a flat article, the frame assembly comprising:
a frame comprising:
a floor structure;
a wall coupled to and surrounding the floor structure, the wall comprising an inner surface defining a display cavity and a front edge that defines a display opening configured to allow the flat article to pass therethrough into the display cavity;
a locking feature on the inner surface of the wall adjacent the front edge; and
a coupling member;
a coupler comprising a retaining element and a mounting element, the mounting element of the coupler coupled to the coupling member of the frame so that the retaining element protrudes into the display cavity, the retaining element of the coupler configured to extend into an opening of the flat article and engage a periphery of the opening of the flat article to couple the flat article to the coupler; and
a window panel positioned in the display cavity and retained in the display cavity by the locking feature on the inner surface of the wall of the frame.

15. The frame assembly of claim 14 further comprising:
a backer panel having an opening therethrough, the backer panel positioned in the display cavity adjacent to the floor structure, the retaining element of the coupler extending through the opening of the backer panel.

16. The frame assembly of claim 14 further comprising:
a first strut extending across the display cavity from a first side of the display cavity to a second side of the display cavity;
a second strut extending across the display cavity from a third side of the display cavity to a fourth side of the display cavity;
the first and second struts dividing the display cavity into four quadrants, and wherein the coupling member comprises an arcuate edge extending between the first and second struts in each of the four quadrants; and
the coupler comprising a body having a front surface, a rear surface, and a peripheral surface extending between the front and rear surfaces, the mounting element of the coupler comprising a plurality of flanges extending from the peripheral surface of the body in a spaced-apart manner so that first portions of the peripheral surface of the body are exposed, and wherein when the coupler is coupled to the coupling member the first portions of the peripheral surface of the body are aligned with the first and second struts and the flanges are aligned with the arcuate edges of the coupling member.

17. The frame assembly of claim 16 wherein each of the flanges comprises a mating arm extending in a direction away from the rear surface of the body, and wherein when the coupler is coupled to the coupling member each of the mating arms is engaged with one of the arcuate edges and the first and second struts extend between each pair of adjacent mating arms.

18. A combined frame assembly and displayed article comprising:
a frame comprising:
a floor structure;
a wall coupled to and surrounding the floor structure, the wall comprising an inner surface defining a display cavity and a front edge that defines a display opening configured to allow the flat article to pass therethrough into the display cavity;
a locking feature on the inner surface of the wall adjacent the front edge; and
a coupling member comprising a mating feature;
a coupler comprising a retaining element and a mounting element, the mounting element of the coupler coupled to the mating feature of the coupling member of the frame so that the retaining element protrudes into the display cavity;
a backer panel having an opening therethrough, the backer panel positioned in the display cavity adjacent to the floor structure, the retaining element of the coupler extending through the opening in the backer panel;
a displayed article having an opening positioned in the display cavity adjacent to the backer panel, the retaining element of the coupler extending into the opening in the displayed article to engage a periphery of the opening of the displayed article to couple the displayed article to the coupler, and
a window panel positioned in the display cavity adjacent to the displayed article, the locking feature on the inner surface of the wall retaining the window panel, the displayed article, and the backer panel within the display cavity.

19. The frame assembly of claim 18 wherein the retaining element of the coupler has a first diameter, the opening in the backer panel has a second diameter, the opening in the displayed article has a third diameter, and a reference circle that includes outermost edges of the coupler has a fourth diameter, the second diameter being greater than each of the first, third, and fourth diameters, the fourth diameter being greater than each of the first and third diameters, and the third diameter being greater than or equal to the first diameter.

20. The frame assembly of claim 18 wherein the flat article is one of a compact disc (CD), a digital video disc (DVD), and a record album.

* * * * *